(12) United States Patent
Dal Zotto

(10) Patent No.: US 12,314,427 B2
(45) Date of Patent: May 27, 2025

(54) VISIBILITIES OF PROTECTED INFORMATION

(71) Applicant: HEWLETT-PACKARD DEVELOPMENT COMPANY, L.P., Spring, TX (US)

(72) Inventor: Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 724 days.

(21) Appl. No.: 17/552,324

(22) Filed: Dec. 15, 2021

(65) Prior Publication Data

US 2023/0185955 A1 Jun. 15, 2023

(51) Int. Cl.
*G06F 21/62* (2013.01)
*G06F 3/04842* (2022.01)
*G06F 21/84* (2013.01)
*G06T 7/136* (2017.01)

(52) U.S. Cl.
CPC ...... *G06F 21/6245* (2013.01); *G06F 3/04842* (2013.01); *G06F 21/84* (2013.01); *G06T 7/136* (2017.01)

(58) Field of Classification Search
CPC .. G06F 21/6245; G06F 21/84; G06F 3/04842; G06T 7/136
See application file for complete search history.

(56) References Cited

U.S. PATENT DOCUMENTS

| 10,347,293 | B1 * | 7/2019 | Skinner | G06F 3/1462 |
| 11,450,104 | B1 * | 9/2022 | Mittal | G06V 40/10 |
| 2020/0342131 | A1 * | 10/2020 | Giralt | G06F 3/0484 |
| 2022/0417450 | A1 * | 12/2022 | Nicholson | G06V 20/59 |

OTHER PUBLICATIONS

Alnemari et al., "Protecting Personally Identifiable Information (PII) in Critical Infrastructure Data Using Differential Privacy," 2019 IEEE International Symposium on Technologies for Homeland Security (HST), pp. 1-6, 2019.
AWS, "Amazon Rekognition," Managed Services: AWS Rekognition, Updated: Nov. 1, 2021, 292 p. (in 4 parts) [Online] https://docs.aws.amazon.com/managedservices/rekognition.html.
Google, "Inspecting Images for Sensitive Data," Data Loss Prevention Documentation, Updated Dec. 15, 2021 UTC, 17 p. [Online] https://cloud.google.com/dlp/docs/inspecting-images.
Marciano et al., "Automating The Detection of Personally Identifiable Information (PII) in Japanese-American WWII Incarceration Camp Records," 2018 IEEE International Conference on Big Data (Big Data), pp. 2725-2732, 2018.
Mun et al., "Analysis and Nudging of Personally Identifiable Information In Online Used Markets," 2019 First IEEE International Conference on Trust, Privacy and Security in Intelligent Systems and Applications (TPS-ISA), pp. 120-129, 2019.
Redmon et al., "YOLOv3: An Incremental Improvement," CoRR, abs/1804.02767, 2018.

* cited by examiner

*Primary Examiner* — Thaddeus J Plecha
(74) *Attorney, Agent, or Firm* — Quarles & Brady LLP

(57) ABSTRACT

In some examples, an electronic device includes a processor to determine an image frame includes protected information, the image frame having a first visibility, and modify, responsive to the determination, an area of the protected information to have a second visibility.

20 Claims, 9 Drawing Sheets

202 (left pane):
```
include <stdio.h> int main(){
    //print Hello, World!
    printf("Hello, World!");
    return 0;
}
```

About
PID: a01bcd345ef67g8!*&h9
Key: z9yx87wvu654t3
SAMPLES\OnlineSoftware\Member
Name\= JQPublic
SAMPLES\OnlineSoftware\Member
Password \= ABC123!@#

206

204 (right pane):
```
include <stdio.h> int main(){
    //print Hello, World!
    printf("Hello, World!");
    return 0;
}
```

About
PID: ▓▓▓▓▓▓▓▓▓
Key: ▓▓▓▓▓
SAMPLES\OnlineSoftware\Member
Name\= ▓▓▓▓
SAMPLES\OnlineSoftware\Member
Password \= ▓▓▓▓▓

208

[Select One] — 210

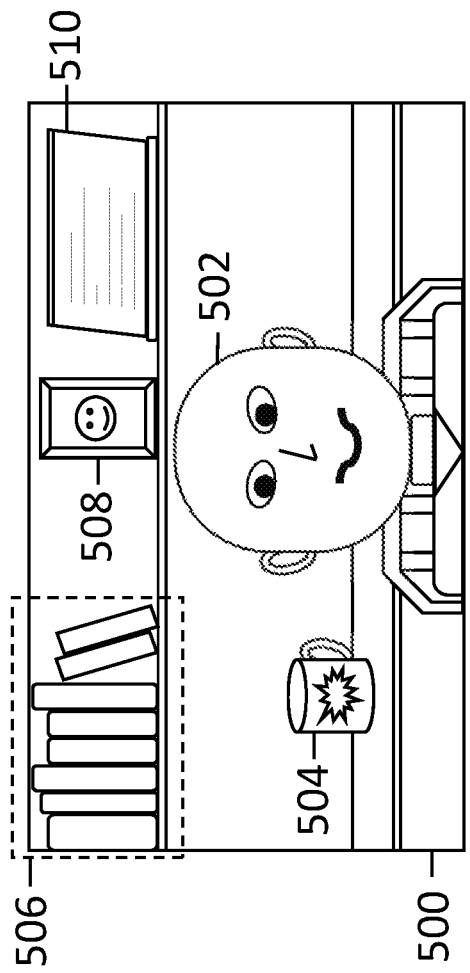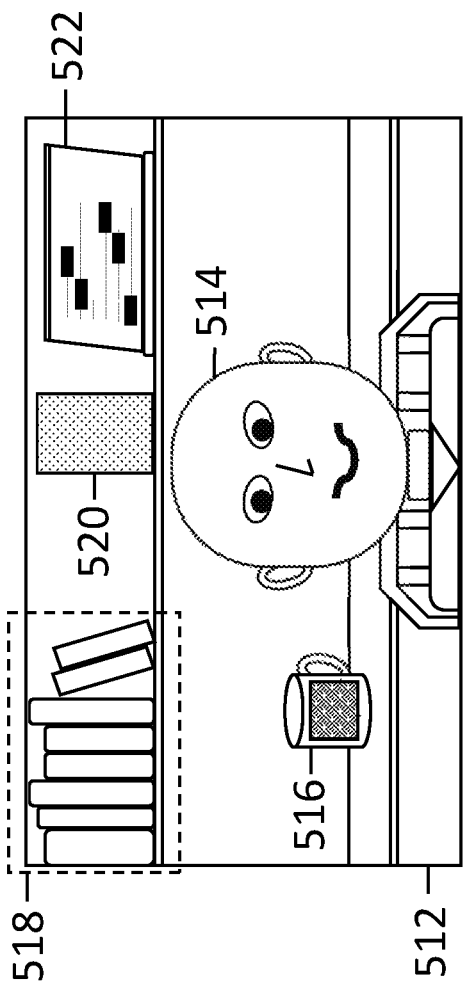

VISIBILITIES OF PROTECTED INFORMATION

BACKGROUND

Electronic devices such as notebooks, laptops, desktops, tablets, and smartphones include executable code that enables the electronic devices to share content with an audience. An electronic device utilizes an executable code to enable a user to generate content to share with the audience. The content includes a video signal captured by an image sensor, data of another executable code captured in images, or a combination thereof, for instance.

BRIEF DESCRIPTION OF THE DRAWINGS

Various examples are described below referring to the following figures.

FIG. 2 is a graphical user interface (GUI) of an electronic device for modifying visibilities of protected information, in accordance with various examples.

FIGS. 5A and 5B are frames utilized by an electronic device for modifying visibilities of protected information, in accordance with various examples.

DETAILED DESCRIPTION

Figure 1:
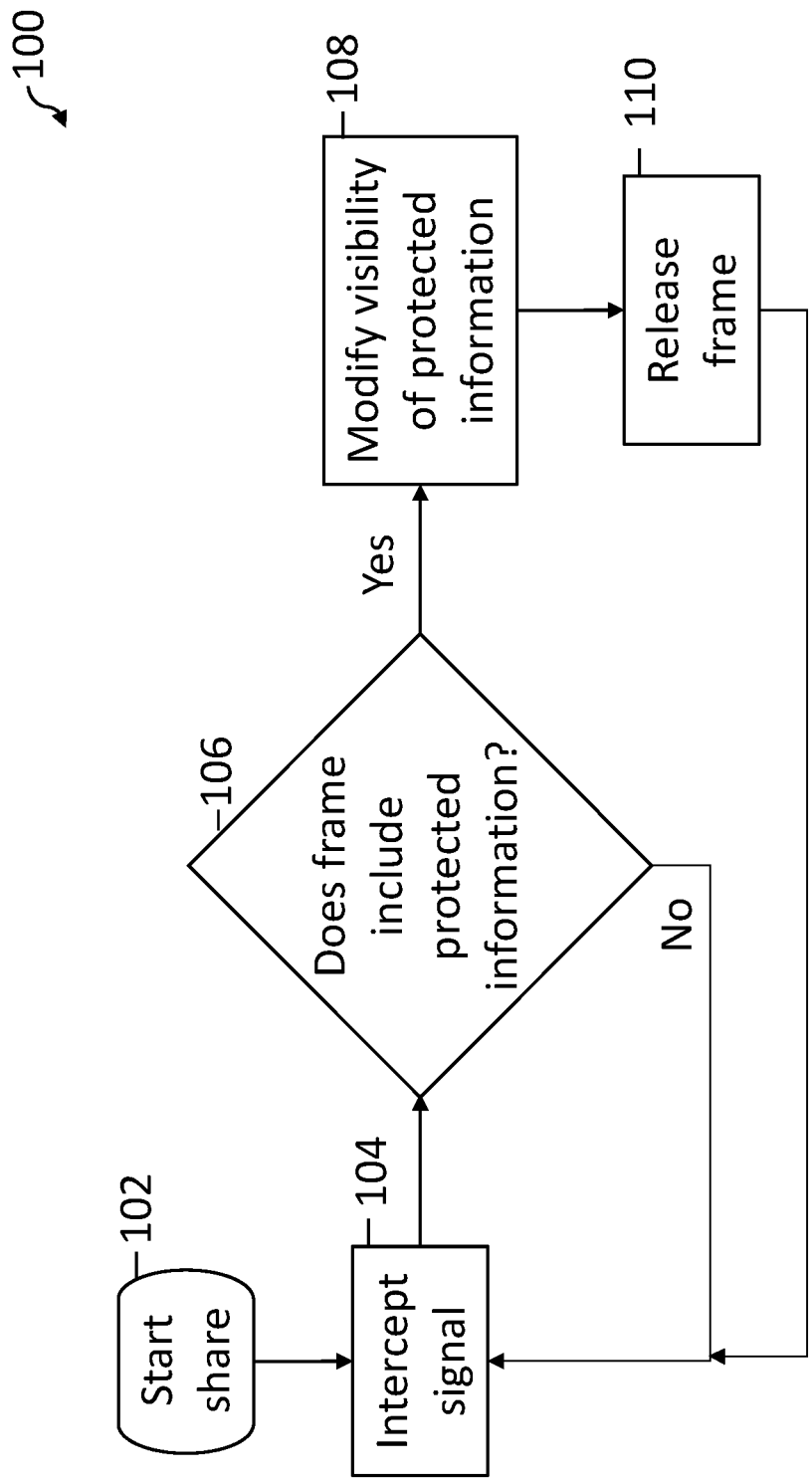
FIG. 1 is a flow diagram depicting a method for an electronic device to modify visibilities of protected information, in accordance with various examples.

As described above, electronic devices include executable code that enables users to share content with an audience during a videoconference. The content is a frame of an image that includes texts, objects, or a combination thereof. The frame is captured by an image sensor of the electronic device, is an image of data generated by an executable code, or a combination thereof. In some instances, the content includes protected information that the user, an administrator, or an enterprise owner of the electronic device wants to block the audience from viewing. The protected information includes personal data, security data, or other data that the user, the administrator, or the enterprise owner determines is sensitive, private, confidential, potentially embarrassing, or otherwise not desirable to be share. For instance, the protected information includes identifiers, passwords, user-defined objects, user-defined words, or a combination thereof. In some instances, sharing of protected information increases risk of a security breach by disclosing information that would enable the audience to access private or confidential data. In other instances, sharing of protected information distracts the audience from the virtual meeting and impacts communication between the user and the audience.

To secure protected information, an electronic device modifies visibility of an area of a frame that includes the protected information. Visibility, as used herein, is a viewability of the area of the frame such that 100% visibility indicates contents of the area of the frame are viewable and 0% visibility indicates contents of the area of the frame are not viewable. The electronic device receives content via a signal, such as a video signal via an image sensor, a data signal generated by an executable code, or a combination thereof. The electronic device analyzes a frame including the content to detect text, objects, or a combination thereof, within the frame. The electronic device determines labels for the text, the objects, or the combination thereof. In various examples, the electronic device determines the labels responsive to a determination that the frame differs from a previous frame by more than a threshold amount. In some examples, the electronic device determines labels for the text, the objects, or the combination thereof in areas of the frame that differ from the previous frame. In various examples, the electronic device does not determine labels for the text, the objects, or the combination thereof in the areas of the frame that do not differ from the previous frame.

The electronic device compares the labels to a list of labels that indicates protected information. Responsive to a determination that a label for text, an object, or a combination thereof, is equivalent to a label on the list of labels that indicates protected information, the electronic device determines an area for the text, the object, or the combination thereof, that is associated with the label. The electronic device utilizes image processing techniques, such as thresholding, object recognition, scene understanding, or a combination thereof, to determine the area. The electronic device modifies the visibility of the area.

To modify the visibility of the area, the electronic device modifies intensities of pixels of the area, blurs the area, overlays an image over the area, or a combination thereof, for example. In some examples, the electronic device modifies the visibility by a multiplier that is based on an indicator associated with the label that indicates protected information. For example, responsive to a determination that the label that indicates protected information has a first indicator, the electronic device reduces the visibility within the area by 50%. Responsive to a determination that the label that indicates protected information has a second indicator, the electronic device reduces the visibility within the area by 100%. In various examples, the electronic device causes a display device to display a prompt to select between a frame not having the modified visibility and a frame having the modified visibility. Responsive to selection of a frame, the electronic device causes the display device to display the selected frame, a network interface to transmit the selected frame, or a combination thereof.

Utilizing the electronic device that modifies the visibility of the protected information based on labels of the text, objects, or the combination thereof, being equivalent to labels of the list of labels that indicate protected information prevents security breaches. Utilizing the electronic device also enhances user, administrator, or enterprise owner confidence that protected information will not be inadvertently exposed. The enhanced confidence increases productivity by enabling the user to share content without pre-editing the content, pre-recording content, or a combination thereof. Modifying the visibility of protected information provides for an enhanced user and audience experience by reducing distractions for the audience. Reducing distractions enhances the effectiveness of communication between the user and the audience.

In some examples in accordance with the present disclosure, an electronic device is provided. The electronic device includes a processor to determine a frame includes protected information, the frame having a first visibility, and modify, responsive to the determination, an area of the protected information to have a second visibility.

In other examples in accordance with the present disclosure, an electronic device is provided. The electronic device includes a processor to determine a frame includes a first protected information and a second protected information, the frame having a first visibility. The processor modifies a first area of the first protected information to have a second visibility and modifies a second area of the second protected information to have a third visibility.

In yet other examples in accordance with the present disclosure, a non-transitory machine-readable medium is provided. The term non-transitory does not encompass signals. The non-transitory machine-readable medium stores machine-readable instructions, which, when executed by a controller of an electronic device, cause the controller to determine whether a difference between a first frame and a second frame exceeds a threshold amount, the second frame subsequent in sequence to the first frame. Responsive to a determination that the difference exceeds the threshold amount, the controller determines whether the second frame includes protected information. Responsive to a determination that the second frame includes protected information, the controller generates a third frame that is equivalent to the second frame and has a first visibility. The controller modifies, within the third frame, an area of the protected information to have a second visibility, the second visibility being less than the first visibility, and causes a display device to display a prompt to select the second frame or the third frame to share with the audience.

As described herein, executable code includes an "application," "software," and "firmware." The terms "application," "software," and "firmware" are considered to be interchangeable in the context of the examples provided. "Firmware" is considered to be machine-readable instructions that a processor of the electronic device executes prior to execution of the operating system (OS) of the electronic device, with a small portion that continues after the OS bootloader executes (e.g., a callback procedure). "Application" and "software" are considered broader terms than "firmware," and refer to machine-readable instructions that execute after the OS bootloader starts, through OS runtime, and until the electronic device shuts down.

Referring now to FIG. 1, a flow diagram showing a method 100 for an electronic device to modify visibilities of protected information is depicted, in accordance with various examples. The method 100 includes starting to share content (102). The method 100 also includes intercepting a signal (104). Additionally, the method 100 includes determining whether a frame of the signal includes protected information (106). Responsive to a determination that the frame does not include protected information, the method 100 includes continuing to intercept the signal. Responsive to a determination that the frame does include protected information, the method 100 includes modifying a visibility of the protected information (108). Additionally, the method 100 includes releasing the frame (110). The method 100 include continuing to intercept the signal.

In various examples, responsive to receiving an indication that a user intends to share content, the electronic device intercepts the signal. The indication that the user intends to share content includes a state of an image sensor changing to an "on," or enabled, state, an event notification indicates an option to share within a GUI has been selected, or a combination thereof. Intercepting the signal intercepts a video signal of the image sensor, data of the executable code that the user indicates is the content to share, or a combination thereof. The electronic device intercepts the signal prior to receipt of the signal by the executable code that enables the user to share the content. To intercept the signal, the electronic device utilizes an executable code that enables capture of the signal pre-processing or post-processing, for example. In some examples, the method 100 includes the electronic device generating an image of the data of the executable code. To determine whether the signal includes protected information, the electronic device examines a frame of the video signal, the image of the data of the executable code, or a combination thereof, for example.

As described above, to find protected information within the frame, the electronic device analyzes the content that includes text, an object, or a combination thereof. For example, the video signal of the image sensor includes documents, prototypes, or other tangible objects located on a surface within a field of view captured by the image sensor. In another example, the data of the executable code that the user indicates is the content to share is content of a display panel of a display device, of a portion of the display panel, of a GUI displayed to the display panel, or of a file type associated with the executable code (e.g., .docx, .pptx., .pdf, .txt, .xls, .jpeg). To detect the text, the object, or the combination thereof, the electronic device utilizes image processing techniques such as image decomposition, an optical character recognition (OCR), object recognition, or a combination thereof.

In some examples, the method 100 includes the electronic device decomposing the frame utilizing image processing techniques that reduce objects within the frame to edge-like structures. For example, the electronic device utilizes grayscaling, blurring, sharpening, thresholding, or a combination thereof. Grayscaling, as used herein, converts the frame to gray tonal values. Blurring, as used herein, utilizes a low pass filter to remove noise, or outlier pixels, from the frame. Sharpening, as used herein, enhances a contrast along edges of objects of the frame. Thresholding, as used herein, separates the frame into foreground values of black and background values of white. Post-thresholding, the frame is reduced to edge-like structures denoted by black pixels, for example.

In other examples, the method 100 includes the electronic device performing the OCR technique. The OCR technique detects typed text, handwritten text, printed text, or a combination thereof. The OCR technique converts the frame into a machine-readable format. In some examples, the electronic device utilizes image processing techniques that enhance areas of the frame that include the text. The image processing techniques include de-skewing, de-speckling, binarization, zoning, normalizing, or a combination thereof, for example. De-skewing, as used herein, realigns the frame horizontally, vertically, or a combination thereof. De-speckling, as used herein, removes spots and smooths edges. Binarization, as used herein, converts a color or grayscale image to black and white. Zoning, as used herein, identifies textual formatting such as columns, paragraphs, captions, or other formatting. Normalizing, as used herein, generates agreement between a scale and an aspect ratio of the frame.

In various examples, the method 100 includes the electronic device performing an object recognition technique on the frame to detect the text, the object, or the combination thereof. For example, the electronic device utilizes a convolutional neural network (CNN) to detect the object. In another example, the electronic device utilizes a region-based CNN (R-CNN). The electronic device divides the frame into multiple regions. In some examples, the electronic device utilizes a Region Proposal Network (RPN) to determine the multiple regions. The electronic device inputs each region into the R-CNN. The electronic device utilizes a support vector machine technique to determine whether the outputs of the R-CNN include the object. In another example, the electronic device utilizes a Fast R-CNN. The electronic device decomposes the frame and then utilizes the decomposed image as an input into the Fast R-CNN to detect the object.

In some examples, the method 100 includes determining a label for the text, the object, or the combination thereof, utilizing the image processing techniques. For example, utilizing the image processing techniques, the electronic device identifies a laptop in the frame. The laptop includes a name of a manufacturer of the laptop. The electronic device determines labels for the laptop include words related to laptop, such as "computer," "electronics," "laptop," or other word or phrase that describes a laptop. The electronic device also determines the labels for the laptop include the name of the manufacturer. In various examples, utilizing the image processing techniques, the electronic device analyzes a scene of the frame to determine a context for the object. For example, the electronic device analyzes the scene according to a scene understanding technique that identifies the text, the object, or the combination thereof, and determines how the text, the object, or the combination thereof, interacts with an environment captured within the frame. For example, the electronic device identifies the laptop of the frame is located within an office environment because of a presence of a desk, a phone, and a clock within the frame. Responsive to the context of the frame, the electronic device includes "office" as another label for the laptop.

The method 100 additionally includes the electronic device comparing the label to a list of labels that indicates protected information, in various examples. In some examples, a GUI enables a user to modify the list of labels to include words, phrases, or a combination thereof, that indicate texts, objects, contexts, or a combination thereof, that indicate possible protected information. Responsive to a determination that the label for the text, the object, or the combination thereof, is equivalent to a label on the list of labels, the method 100 includes the electronic device determining an area for the text, the object, or the combination thereof. The electronic device utilizes image processing techniques to determine the area, for example.

To modify the visibility of the area, the electronic device modifies intensities of pixels of the area. In other examples, the electronic device modifies the visibility of the area by overlaying the area with another image. For example, the electronic device overlays the area with an image that indicates protected information is hidden. In some examples, to modify the visibility of the area, the electronic device generates a duplicate of the frame of the intercepted signal and modifies the visibility of the duplicate frame. In various examples, the method 100 includes the electronic device causing a display device to display a prompt to select between a frame not having the modified visibility and a frame having the modified visibility. For example, the electronic device causes the display device to display the frame of the intercepted signal and the duplicate frame having the modified visibility. Responsive to a selection of the frame not having the modified visibility, releasing the frame includes the electronic device causing the display device to display the frame not having the modified visibility. Responsive to a selection of the frame having the modified visibility, releasing the frame includes the electronic device causing the display device to display the frame having the modified visibility.

Referring now to FIG. 2, a GUI 204 of an electronic device 200 for modifying visibilities of protected information is depicted, in accordance with various examples. The electronic device 200 is a notebook, a laptop, a desktop, a tablet, a smartphone, or any other suitable computing device that includes the executable code that enables the user to share content. The electronic device 200 includes a display device 202. The display device 202 is a liquid crystal display (LCD), a light-emitting diode (LED) display, a plasma display, a quantum dot (QD) display, or any suitable device for displaying data of the electronic device 200 for viewing. The display device 202 includes the GUI 204. The GUI 204 includes frames 206, 208 and a prompt 210. A frame 206 is a frame of the intercepted signal, for example. A frame 208 is the frame 206 with a modified visibility of protected information. The prompt 210 displays a prompt to a user to "Select One," for example.

In some examples, the display device 202 is an integrated display device of the electronic device 200. In other examples, the display device 202 couples to any suitable connection for enabling communications between the electronic device 200 and the display device 202. The connection may be via a wired connection (e.g., Universal Serial Bus (USB), a High-Definition Multimedia Interface (HDMI) connector, or a Video Graphics Array (VGA) connector, Digital Visual Interface (DVI)) or via a wireless connection (e.g., BLUETOOTH®, Wi-Fi®), for example.

As described above with respect to FIG. 1, the electronic device 200 intercepts the signal including the frame 206. The frame 206 includes data of the executable code that the user indicates is the content to share. In some examples, the frame 206 is an image of the data of the executable code. To determine whether the signal includes protected information, the electronic device 200 utilizes an OCR technique to identify text, for example. The electronic device 200 compares the text identified to the list of labels that indicate protected information to determine that the frame 206 includes multiple areas that include protected information. For example, the electronic device 200 determines that the frame 206 includes identifiers, as indicated by the words "PID" and "MemberName." The electronic device 200 determines that the frame 206 includes passwords, as indicated by the words "Key" and "MemberPassword." The electronic device 200 compares the labels "identifier" and "password" to the list of labels that indicates protected information to determine that the text that follows the words are protected information.

Responsive to a determination that identifier and password are equivalent to labels on the list of labels, the electronic device 200 determines an area for the text indicated by the labels. For example, the electronic device 200 utilizes the OCR technique to determine the areas are indicated by the text "a01bcd345ef67g8!*&h9," "z9yx87wvu654t3," "JQPublic," and "ABC123!@#," for example. The electronic device 200 modifies visibility of the frame 206 to generate the frame 208. For example, the electronic device 200 modifies the visibility by modifying intensities of pixels of the areas to have the black-dotted gray areas of the frame 208.

Figure 3:
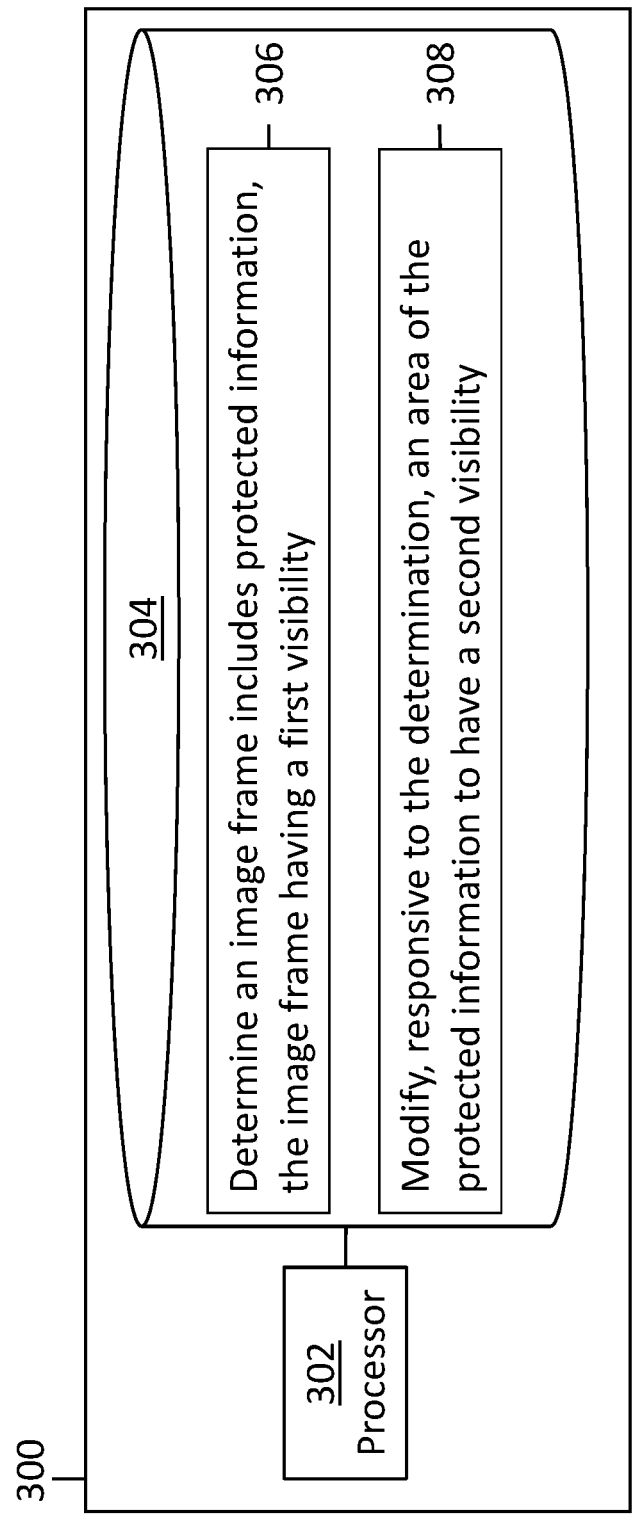
FIG. 3 is a block diagram depicting an electronic device for modifying visibilities of protected information, in accordance with various examples.

Referring now to FIG. 3, a block diagram showing an electronic device 300 for modifying visibilities of protected information is depicted, in accordance with various examples. The electronic device 300 is a desktop, a laptop, a notebook, a tablet, a smartphone, or any other suitable computing device for receiving and processing frames. The electronic device 300 includes a processor 302 and a storage device 304. The processor 302 is a microprocessor, a microcomputer, a microcontroller, or another suitable processor or controller for managing operations of the electronic device 300. The processor 302 is a central processing unit (CPU), graphics processing unit (GPU), system on a chip (SoC), image signal processor (ISP), or a field programmable gate array (FPGA), for example. The storage device 304 includes a hard drive, solid state drive (SSD), flash memory, random access memory (RAM), or other suitable memory for storing data or executable code of the electronic device 300.

While not explicitly shown, the electronic device 300 includes network interfaces, video adapters, sound cards, local buses, peripheral devices (e.g., a keyboard, a mouse, a touchpad, a speaker, a microphone, an image sensor, a display device), wireless transceivers, connectors, or a combination thereof. While in some examples, a peripheral device is an integrated component of the electronic device 300, in other examples, the peripheral device couples to any suitable connection for enabling communications between the electronic device 300 and the peripheral device. The connection may be via a wired connection (e.g., a USB) or via a wireless connection (e.g., BLUETOOTH®, Wi-Fi®). The display device is an LCD display, an LED display, a plasma display, a QD display, or any suitable device for displaying data of the electronic device 300 for viewing. A connection that couples the display device to the electronic device 300 may be via a wired connection (e.g., USB connector, HDMI connector, a VGA connector, a DVI) or via a wireless connection (e.g., BLUETOOTH®, Wi-Fi®).

In some examples, the processor 302 couples to the storage device 304. The storage device 304 stores machine-readable instructions which, when executed by the processor 302, cause the processor 302 to perform some or all of the actions attributed herein to the processor 302. The machine-readable instructions are the machine-readable instructions 306, 308.

In various examples, the machine-readable instructions 306, 308, when executed by the processor 302, cause the processor 302 to modify visibilities of protected information. The machine-readable instruction 306, when executed by the processor 302, causes the processor 302 to determine a frame includes protected information. The frame has a first visibility. Responsive to the determination, the machine-readable instruction 308, when executed by the processor 302, causes the processor 302 to modify an area of the protected information to have a second visibility.

In some examples, another machine-readable instruction, when executed by the processor 302, causes the processor 302 to cause a display device (e.g., the display device 202) to display the frame, a network interface (not explicitly shown) to transmit the frame, or a combination thereof, the frame including the area of the protected information having the second visibility.

In other examples, other machine-readable instructions, when executed by the processor 302, cause the processor 302 to implement the method 100. For example, in response to receiving the indication that the user intends to share content, the processor 302 intercepts the signal. To intercept the signal, the processor 302 intercepts a video signal of the image sensor (not explicitly shown), data of the executable code that the user indicates is the content to share, or a combination thereof. In various examples, the processor 302 intercepts a first frame having a first source (e.g., the image sensor) and a second frame having a second source (e.g., the data of the executable code that the user indicates is shared content). The processor 302 determines that the first frame includes a first protected information and the second frame includes a second protected information. The first and the second frames have a first visibility. Responsive to the determination, the processor 302 modifies a first area of the first protected information and a second area of the second protected information to have a second visibility. The processor 302 causes the display device to display the first frame, the second frame, or a combination thereof. For example, the processor 302 causes a GUI (e.g., the GUI 204) to display the first frame having the first visibility, the first frame having the first area with the second visibility, the second frame having the first visibility, the second frame having the second area with the second visibility, or a combination thereof. The processor 302 causes the display device to display a prompt indicating that the user is to select which frames to share.

In various examples, as described above with respect to FIG. 1, to modify the area of the protected information to have the second visibility, the processor 302 generates a duplicate of the frame of the intercepted signal. The processor 302 determines the frame of the intercepted signal is the first frame. The processor 302 generates a second frame, the second frame a duplicate of the first frame. Responsive to the determination that the frame includes the protected information, the processor 302 modifies the area of the protected information within the second frame. The processor 302 causes the display device to display a prompt to select between the first frame and the second frame. In various examples, responsive to a selection of the first frame, the processor 302 causes the display device to display the first frame, the network interface to transmit the first frame, or a combination thereof. Responsive to a selection of the second frame, the processor 302 causes the display device to display the second frame, the network interface to transmit the second frame, or a combination thereof.

As described above with respect to FIG. 1, in other examples, to modify the visibility of the area, the processor 302 overlays the area with an image. For example, the image is a geometric shape having a solid color or other pattern. In another example, the image includes a logo or other graphical or explanatory element. In some examples, to modify the visibility of the area, the processor 302 overlays the area with a video signal. The processor 302 generates the second visibility by inserting the image, the video signal, or a combination thereof, in the area of the protected information. In some examples, the processor 302 determines dimensions of the area. The processor 302 modifies dimensions of the image, the video signal, or the combination thereof, to be equivalent to the dimensions of the area. The processor 302 utilizes image processing techniques to merge the image, the video signal, or the combination thereof, with the frame. For example, the processor 302 causes the pixels of the area to display the pixels of the image.

Figure 4:
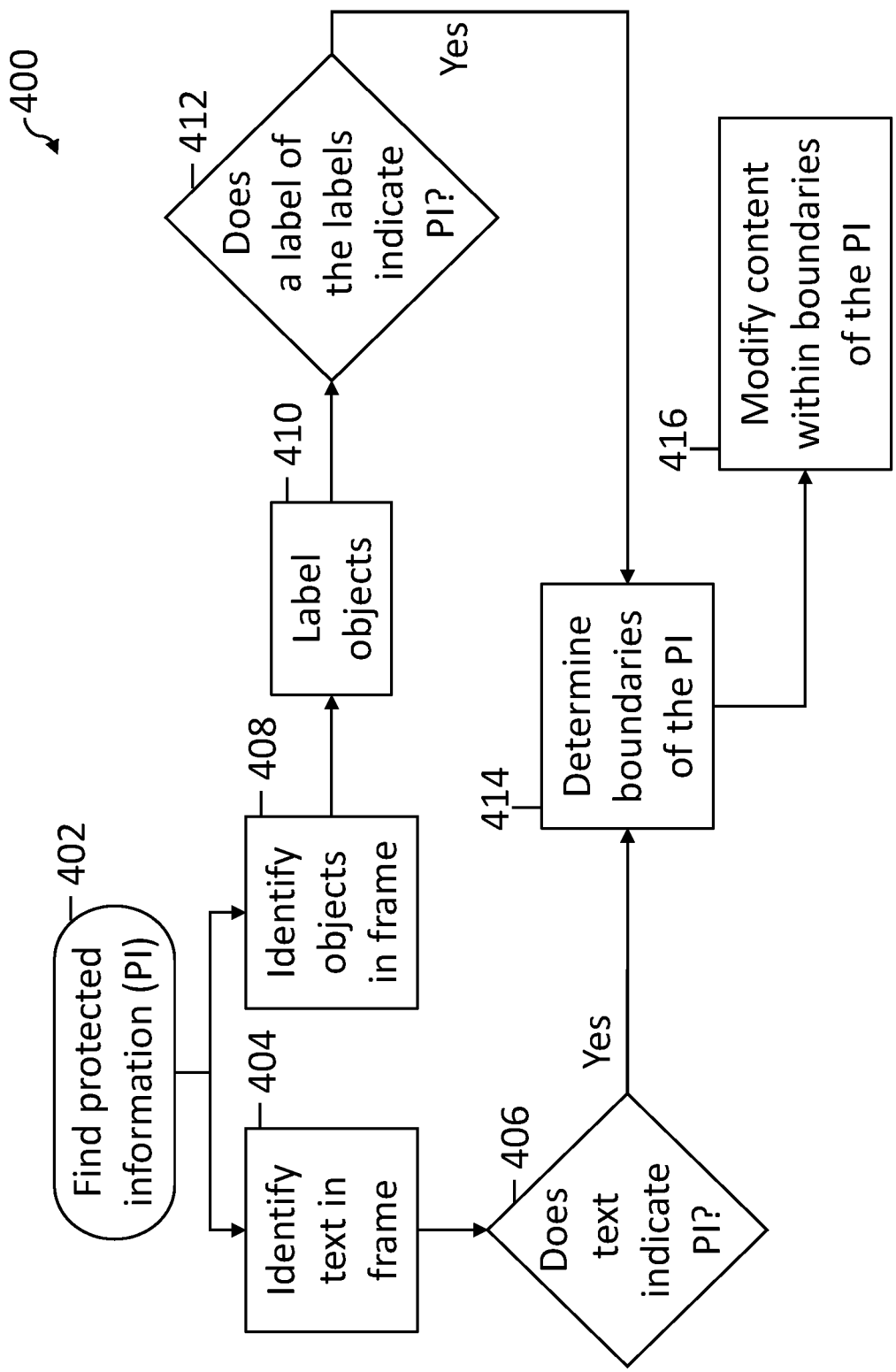
FIG. 4 is a flow diagram depicting a method for an electronic device to modify visibilities of protected information, in accordance with various examples.

Referring now to FIG. 4, a flow diagram showing a method 400 for an electronic device (e.g., the electronic device 300) to modify visibilities of protected information is depicted, in accordance with various examples. The method 400 is for finding protected information (402). The protected information is referred to as "PI" in FIG. 4. The method 400 identifies text in a frame (e.g., the frame 206) (404). Additionally, the method 400 includes determining whether the text indicates protected information (406). The method 400 also identifies objects in the frame (408). The method 400 includes labeling the objects (410). Additionally, the method 400 includes determining whether a label indicates protected information (412). The method 400 also includes determining boundaries of the protected information identified responsive to determinations that indicate the text, the objects, or the combination thereof include protected information (414). The method 400 includes modifying content within the boundaries (416).

As described above with respect to FIG. 1, in some examples, the intercepted signal includes images of documents, prototypes, or other tangible objects located on a surface within a field of view captured by an image sensor. To detect the text, the object, or the combination thereof, the electronic device utilizes the method 400, for example. To identify the text in a frame of the intercepted signal, the electronic device utilizes the OCR techniques described above with respect to FIG. 1, for example. To identify the objects in the frame of the intercepted signal, the electronic device utilizes the object recognition techniques described above with respect to FIG. 1, for example.

In various examples, as described above with respect to FIG. 3, to intercept the signal, the electronic device intercepts a video signal of the image sensor, data of the executable code that the user indicates is the content to share, or a combination thereof. In various examples, the electronic device intercepts a first frame having a first source (e.g., the image sensor) and a second frame having a second source (e.g., the data of the executable code that the user indicates is shared content). The electronic device determines that the first frame includes a first protected information utilizing a first image processing technique and the second frame includes a second protected information utilizing a second image processing technique. For example, the electronic device determines that the first frame includes the first protected information by comparing text identified utilizing the OCR techniques described above with respect to FIG. 1 to the list of labels that indicate protected information. The electronic device determines that the second frame includes the second protected information by comparing objects identified utilizing the image decomposition, the object recognition techniques, the scene understanding, or a combination thereof, as described above with respect to FIG. 1 to the list of labels that indicate protected information.

In some examples, the electronic device determines boundaries of the protected information to determine the areas of the protected information, as described above with respect to FIG. 1, 2, or 3. In various examples, the boundaries are irregular boundaries. In other examples, the boundaries are for a geometric shape, such as a rectangle, circle, oval, or other suitable shape that encompasses an area of the protected information. The electronic device modifies the content within the boundaries. For example, the electronic device merges another image into the area determined by the boundaries utilizing the techniques described above with respect to FIG. 3. In another example, the electronic device reduces an intensity of the pixels within the boundaries by an intensity threshold. For example, responsive to the intensity threshold, the electronic device reduces the intensity of the pixels within the boundaries by 50%.

FIGS. 5A and 5B are frames 500, 512 utilized by an electronic device (e.g., the electronic device 300) for modifying visibilities of protected information, in accordance with various examples. Frame 500 of FIG. 5A includes objects 502, 504, 506, 508, 510. An object 502 is a user, for example. An object 504 is a mug, for example. An object 506 is a stack of books, for example. An object 508 is a photo, for example. An object 510 is a laptop, for example. Frame 512 of FIG. 5B includes objects 514, 516, 518, 520, 522. The frame 512 is the frame 500 having visibilities of protected information modified, for example. An object 514 is the object 502, for example. An object 516 is the object 504, for example. An object 518 is the object 506, for example. An object 520 is the object 508, for example. An object 522 is the object 510, for example.

In various examples, the electronic device intercepts the frame 500. Utilizing the image processing techniques described above with respect to FIG. 1 or 4, for example, the electronic device identifies protected information of the frame 500. For example, utilizing an OCR technique, the electronic device determines the objects 504, 508, 510, or a combination thereof, include text that is equivalent to a label of the list of labels that indicates protected information. In another example, utilizing an object recognition technique, the electronic device determines that the objects 504, 508, 510, or a combination thereof, include an image having a label that is equivalent to a label of the list of labels that indicates protected information.

As described above with respect to FIG. 4, in some examples, the electronic device determines boundaries of the protected information and modifies the content within the boundaries. For example, the electronic device reduces an intensity of the pixels within the boundaries by an intensity threshold that is associated with an indicator that indicates a sensitivity of the protected information within the boundaries. In some examples, the label that indicates the protected information is associated with the indicator that indicates the sensitivity of the protected information. Responsive to a determination that the label that indicates the protected information has a first indicator, the electronic device reduces the visibility within the boundaries by a first intensity threshold. Responsive to a determination that the label that indicates the protected information has a second indicator, the electronic device reduces the visibility within the boundaries by a second intensity threshold. Responsive to a determination that the label that indicates the protected information has a third indicator, the electronic device reduces the visibility with the boundaries by a third intensity threshold.

In some examples, responsive to the indicators, the electronic device modifies the frame 512 to have different visibilities. For example, responsive to a determination that the label that indicates the protected information of the object 520 has a label that is associated with a first indicator, the electronic device reduces the visibility within the boundaries of the object 520 by 50%, as indicated by the black-dotted gray area. Responsive to a determination that the label that indicates the protected information of the object 516 has a second indicator, the electronic device reduces the visibility within the boundaries of the protected information by 75%, as indicated by the white-dotted gray area. Responsive to a determination that the label that indicates the protected information of the object 522 has a third indicator, the electronic device reduces the visibility within the boundaries of the protect information of the object 522 by 100%, as indicated by the blackened areas.

Figure 6:
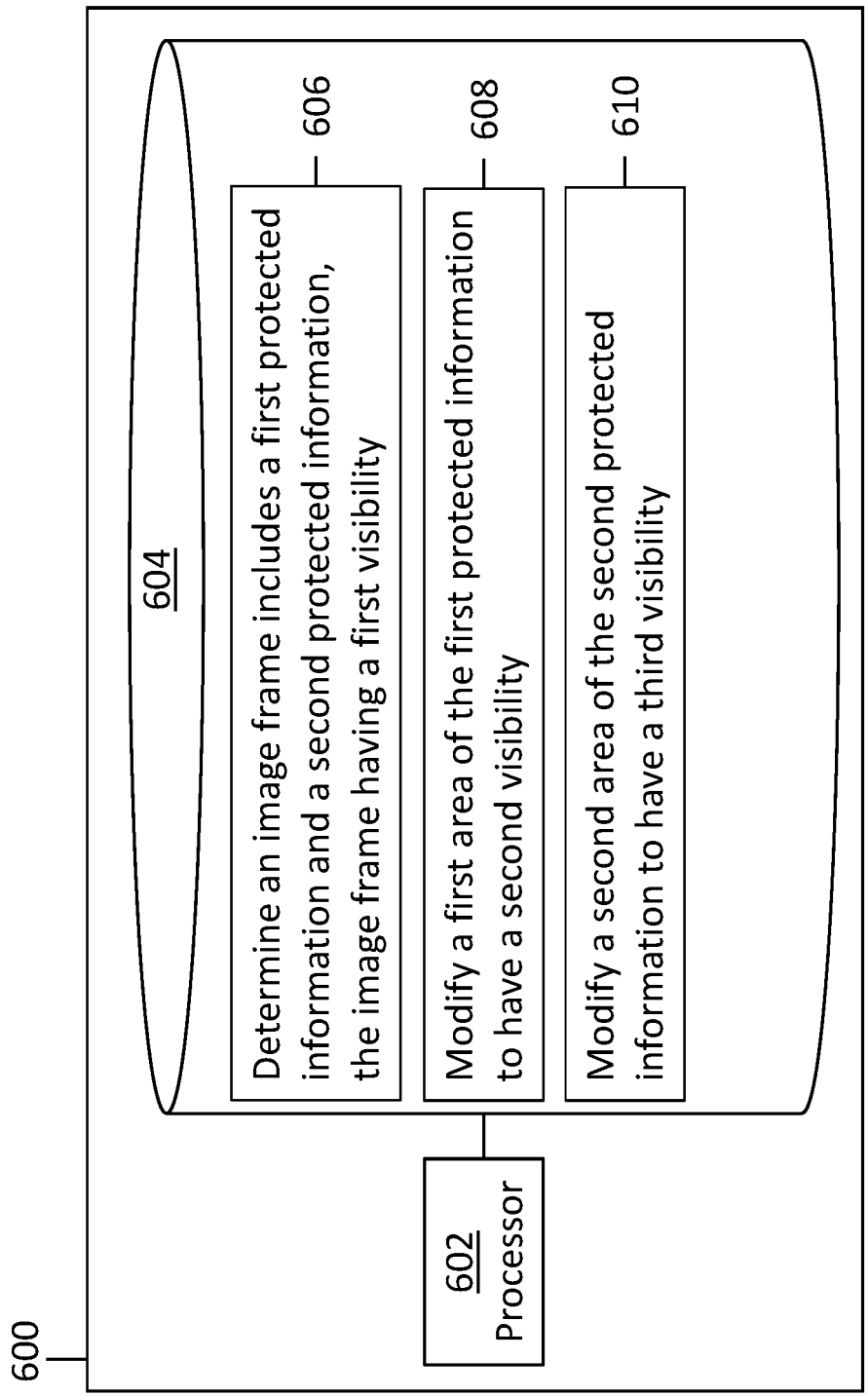
FIG. 6 is a block diagram depicting an electronic device for modifying visibilities of protected information, in accordance with various examples.

FIG. 6 is a block diagram showing an electronic device 600 for modifying visibilities of protected information, in accordance with various examples. The electronic device 600 is the electronic device 300, for example. The electronic device 600 includes a processor 602 and a storage device

604. The processor 602 is the processor 302, for example. The storage device 604 is the storage device 304, for example.

In various examples, the processor 602 couples to the storage device 604. The storage device 604 stores machine-readable instructions which, when executed by the processor 602, cause the processor 602 to perform some or all of the actions attributed herein to the processor 602. The machine-readable instructions are the machine-readable instructions 606, 608, 610.

In some examples, the machine-readable instructions 606, 608, 610, when executed by the processor 602, cause the processor 602 to modify visibilities of protected information. The machine-readable instruction 606, when executed by the processor 602, causes the processor 602 to determine a frame (e.g., the frame 500) includes a first protected information (e.g., the object 508) and a second protected information (e.g., text or image of the object 504). The frame has a first visibility. The machine-readable instruction 608, when executed by the processor 602, causes the processor 602 to modify a first area of the first protected information to have a second visibility (e.g., the object 520). The machine-readable instruction 610, when executed by the processor 602, causes the processor 602 to modify a second area of the second protected information to have a third visibility (e.g., the object 516).

In various examples, the frame is a first frame having a first source, and the processor 602 determines a second frame having a second source includes a third protected information. The second frame has the first visibility. For example, the first source is an image sensor (not explicitly shown), and the second source is data of an executable code. Responsive to the determination that the second frame includes the third protected information, the processor 602 modifies a third area of the third protected information to have the third visibility. The processor 602 causes a display device (e.g., the display device 202) to display the first frame and the second frame.

In other examples, as described above with respect to FIG. 5, the processor 602 determines the different visibilities responsive to indicators that indicate a sensitivity of the protected information. For example, responsive to a first indicator of the first protected information, the processor 602 determines the second visibility. Responsive to a second indicator of the second protected information, the processor 602 determines the third visibility. In various examples, the processor 602 determines the second and the third visibilities utilizing a first and a second intensity threshold, respectively. In some examples, the processor 602 causes the display device to display a GUI (e.g., the GUI 204) that enables a user to modify the indicators, the labels, or a combination thereof, utilized to identify the protected information.

Figure 7:
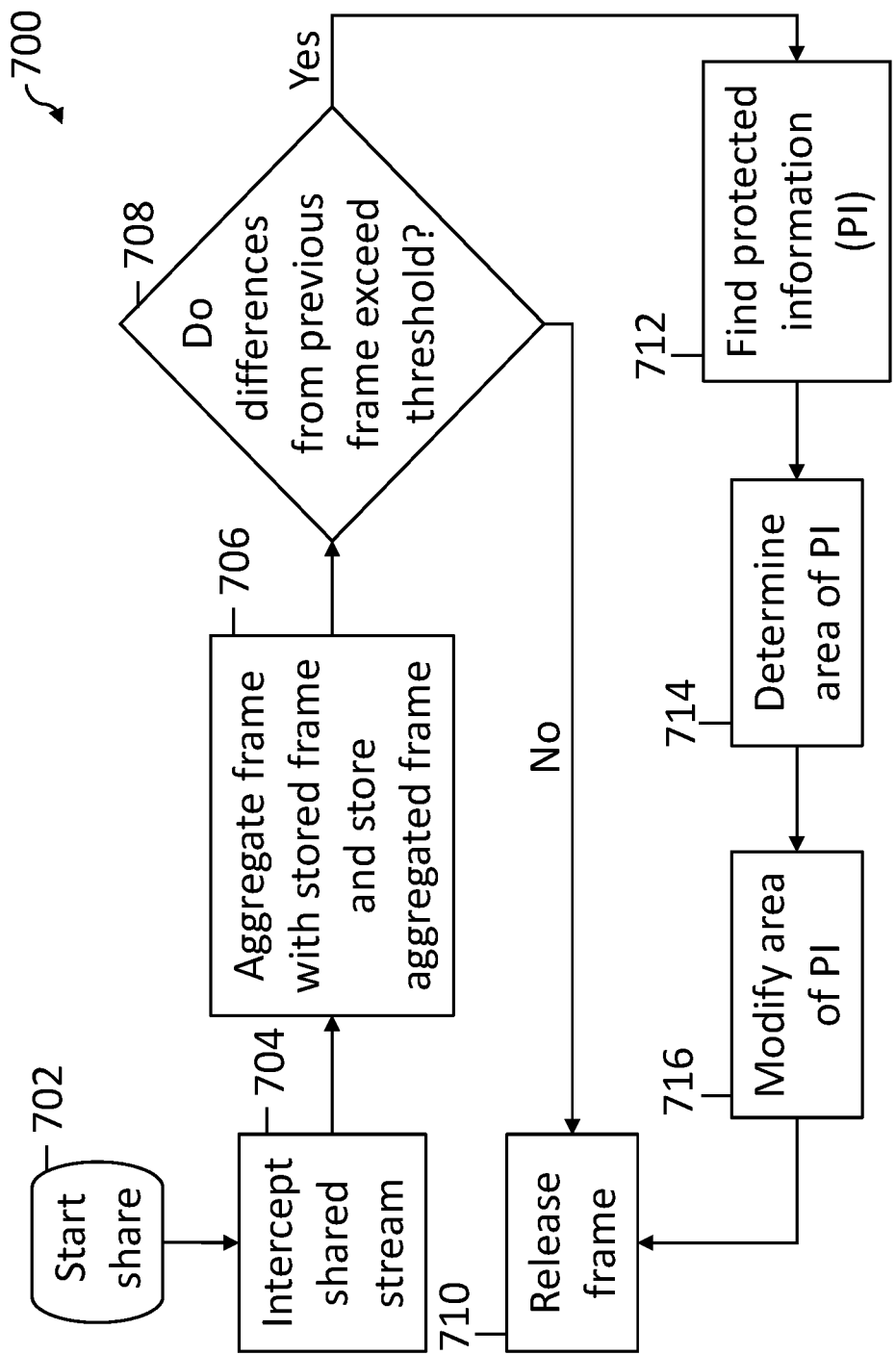
FIG. 7 is a flow diagram depicting an electronic device for modifying visibilities of protected information, in accordance with various examples.

Referring now to FIG. 7, a flow diagram showing a method 700 for an electronic device (e.g., the electronic device 200, 300, 600) to modify visibilities of protected information is depicted, in accordance with various examples. The method 700 includes starting to share content (702). The method 700 also includes intercepting a shared stream (704). Additionally, the method 700 includes aggregating a frame of the shared stream with a stored frame of the shared stream and storing the aggregated frame (706). The method 700 includes determining whether differences between the frame and the previous frame exceed a threshold amount (708). Responsive to a determination that the differences do not exceed the threshold amount, the method 700 includes releasing the stored aggregated frame (710).

Responsive to a determination that the differences do exceed the threshold amount, the method 700 includes finding protected information in the aggregated frame (712). The protected information is referred to as "PI" in FIG. 7. Additionally, the method 700 includes determining an area of the protected information (714). The method 700 also modifies the area of the protected information (716). The method 700 includes releasing the aggregated frame having the modified area.

Figure 8A:
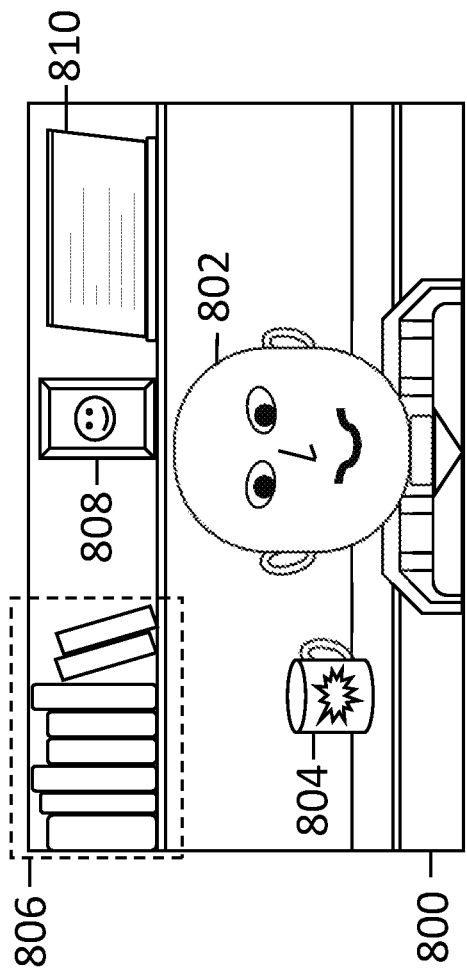
FIGS. 8A, 8B, and 8C are frames utilized by an electronic device for modifying visibilities of protected information, in accordance with various examples.
Figure 8B:
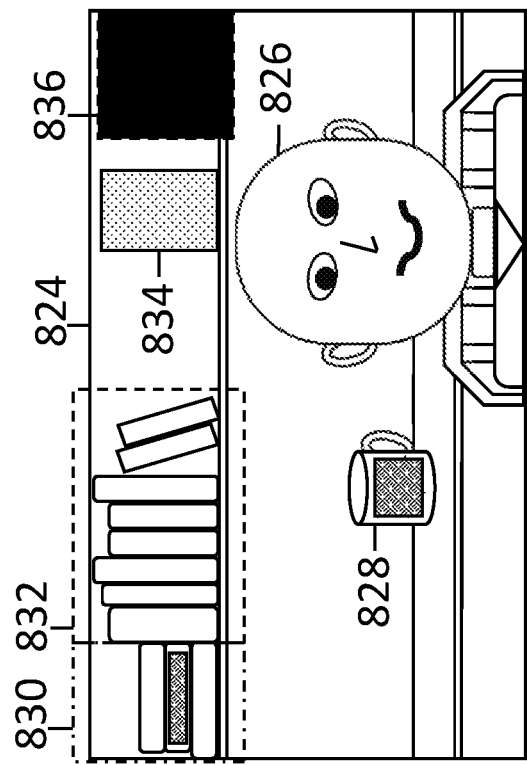
Figure 8C:
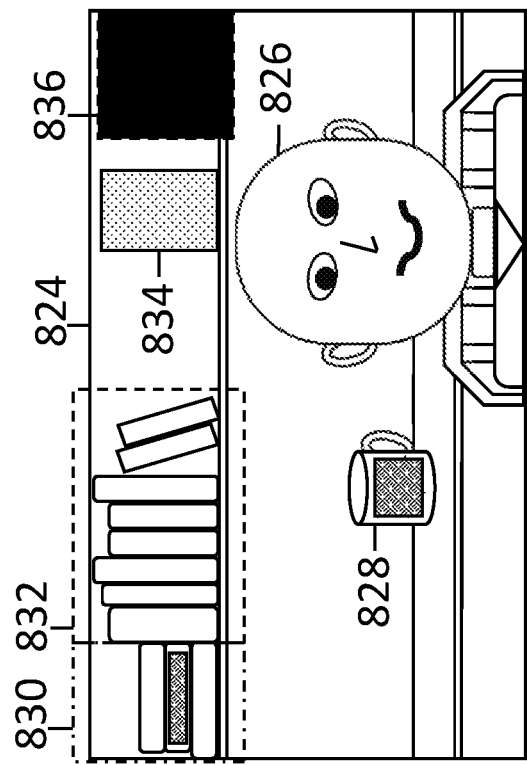

Referring now FIGS. 8A, 8B, and 8C, frames 800, 812, 824 for an electronic device (e.g., the electronic device 200, 300, 600) for modifying visibilities of protected information, in accordance with various examples. The frames 800, 812, 824 demonstrate the electronic device utilizing the method 700 to modify the visibilities of the protected information, for example.

Frame 800 of FIG. 8A includes objects 802, 804, 806, 808, 810. An object 802 is a user, for example. An object 804 is a mug, for example. An object 806 is a stack of books, for example. An object 808 is a photo, for example. An object 810 is a laptop, for example.

Frame 812 of FIG. 8B includes objects 814, 816, 818, 820, 822. The frame 812 is the frame 800 having visibilities of protected information modified, for example. An object 814 is the object 804, for example. An object 816 is the object 806, for example. An object 818 is the object 808, for example. An object 820 is the object 810, for example. An object 822 is the object 802, for example.

Frame 824 of FIG. 8C includes objects 826, 828, 830, 832, 834, 836. The frame 824 is the frame 812 having visibilities of protected information modified, for example. An object 826 is the object 822, for example. An object 828 is the object 814, for example. An object 830 is an object not included in the frame 812, for example. An object 832 is the object 816, for example. An object 834 is the object 818, for example. An object 836 is the object 820, for example.

In various examples, as described above with respect to FIG. 7, the electronic device intercepts a shared stream. The shared stream is a video signal received by an image sensor, for example. The electronic device stores a first frame (e.g., the frame 800) of the shared stream. The electronic device determines whether the first frame includes protected information. For example, the electronic device determines that the objects 804, 808, 810 include a first, a second, and a third protected information, respectively. The electronic device determines areas of the protected information. For example, the electronic device determines that a first label of the object 804 indicates a first sensitivity of the first protected information. The electronic device determines that a second label of the object 808 indicates a second sensitivity of the second protected information. The electronic device determines that a third label of the object 810 indicates a third sensitivity of the third protected information. The electronic device modifies the visibilities within the areas and displays a frame having the modified visibilities (e.g., the frame 812). For example, the electronic device modifies a first area of the object 814 to have a first intensity, a second area of the object 818 to have a second intensity, a third area of the object 820 to have a third intensity.

In some examples, the electronic device aggregates a second frame with the first frame and stores the aggregated frame. Responsive to a determination that the differences between the second frame and the first frame do not exceed the threshold amount, the electronic device releases the aggregated frame. The electronic device continues to aggregate subsequent frames with previously stored aggregated frames until the differences between the aggregated frame and a previously stored aggregated frame exceed the threshold amount. Responsive to a determination that the differences exceed the threshold amount, the electronic device finds protected information in the aggregated frame. For example, the electronic device determines that the objects 828, 830, 834, 836 include a first, a second, a third, and a fourth protected information respectively. The electronic device determines areas of the protected information and modifies the visibilities within the areas. For example, the electronic device determines that a first label of the object 828 indicates a first sensitivity of the first protected information and modifies a first area of the object 828 to have a first intensity. The electronic device determines that a second label of the object 830 indicates the first sensitivity of the second protected information and modifies a second area of the object 830 to have the first intensity. The electronic device determines that a third label of the object 834 indicates a second sensitivity of the third protected information and modifies a third area of the object 834 to have a second intensity. The electronic device determines that a fourth label of the object 836 indicates a third sensitivity of the fourth protected information and modifies a fourth area of the object 836 to have a third intensity.

Figure 9:
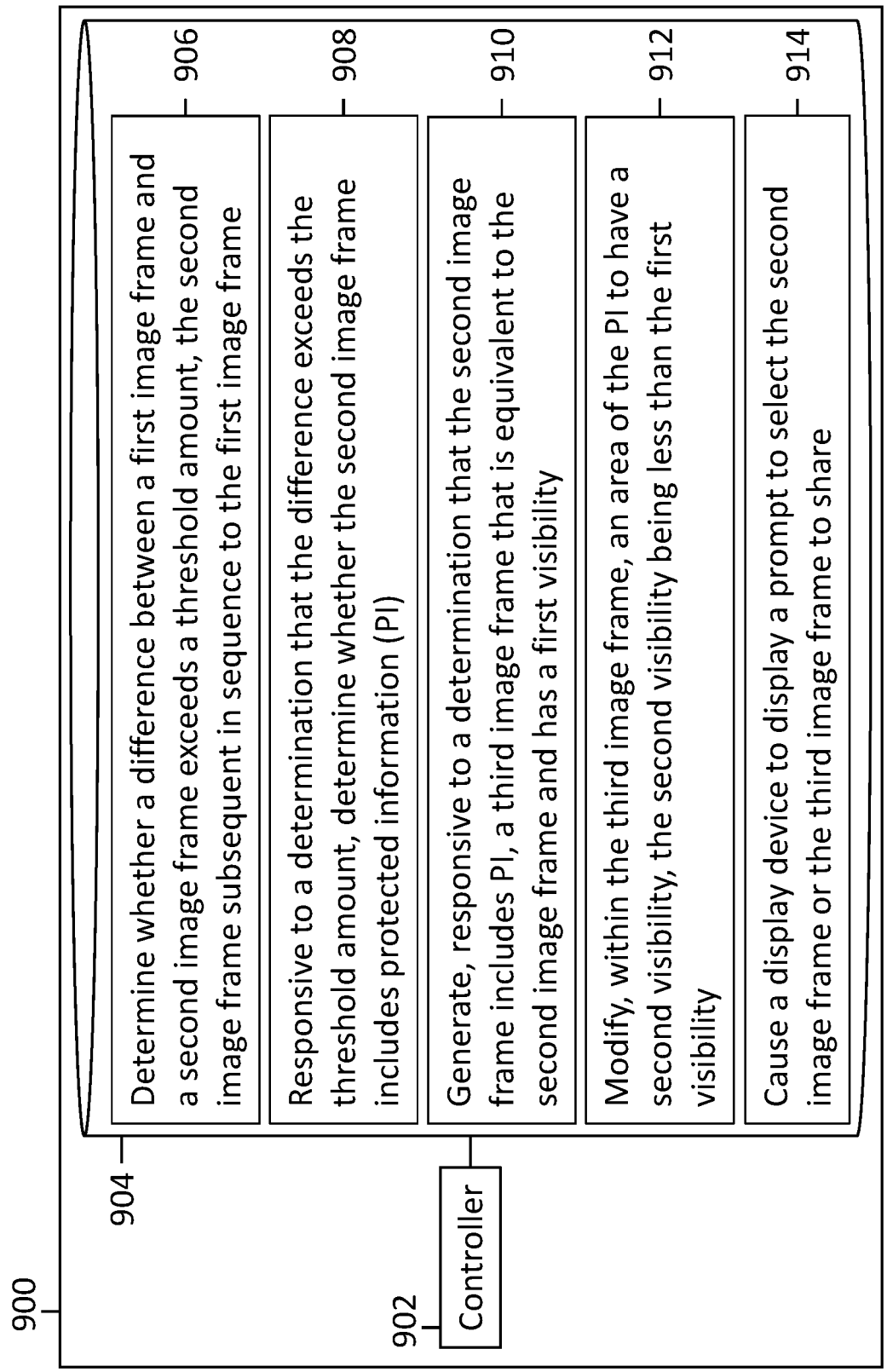
FIG. 9 is a block diagram depicting an electronic device for modifying visibilities of protected information, in accordance with various examples.

FIG. 9 is a block diagram showing an electronic device 900 for modifying visibilities of protected information, in accordance with various examples. The electronic device 900 is the electronic device 200, 300, 600, for example. The electronic device 900 includes a controller 902 and a non-transitory machine-readable medium 904. The controller 902 is the processor 302, 602, for example. In another example, the controller 902 is a controller of an artificial intelligence (AI) circuit. The non-transitory machine-readable medium 904 is the storage device 304, 604, for example.

In various examples, the controller 902 couples to the non-transitory machine-readable medium 904. The non-transitory machine-readable medium 904 stores machine-readable instructions. The machine-readable instructions are the machine-readable instructions 906, 908, 910, 912, 914. The machine-readable instructions 906, 908, 910, 912, 914, when executed by the controller 902, cause the controller 902 to perform some or all of the actions attributed herein to the controller 902.

In some examples, when executed by the controller 902, the machine-readable instructions 906, 908, 910, 912, 914 cause the controller 902 to modify visibilities of frames (e.g., the frames 500, 512, 800, 812, 824). The machine-readable instruction 906, when executed by the controller 902, causes the controller 902 to determine whether a difference between a first frame and a second frame exceeds a threshold amount, the second frame subsequent in sequence to the first frame. Responsive to a determination that the difference exceeds the threshold amount, the machine-readable instruction 908, when executed by the controller 902, causes the controller 902 to determine whether the second frame includes protected information. Responsive to a determination that the second frame includes protected information, the machine-readable instruction 910, when executed by the controller 902, causes the controller 902 to generate a third frame that is equivalent to the second frame and has a first visibility. The machine-readable instruction 912, when executed by the controller 902, causes the controller 902 to modify, within the third frame, an area of the protected information to have a second visibility. The second visibility is less than the first visibility. The machine-readable instruction 914, when executed by the controller 902, causes the controller 902 to cause a display device (e.g., the display device 202) to display a prompt to select the second frame or the third frame to share with the audience.

In various examples, the first frame has a first visibility for a first set of pixels and a second visibility for a second set of pixels. Responsive to a determination that the difference is less than the threshold amount, the controller 902 modifies the second frame to have the first visibility for the first set of pixels and the second visibility for the second set of pixels. In some examples, the threshold amount is determined responsive to a frame rate of a display device. For example, responsive to a frame rate of 30 frames per second (fps), the controller 902 determines that the threshold amount is a first threshold amount. Responsive to a frame rate of 60 fps, the controller 902 determines that the threshold amount is a second threshold amount, where the second threshold amount is greater than the first threshold amount.

In other examples, to determine whether the second frame includes protected information, the controller 902 determines that a first set of pixels of the first frame is equivalent to a second set of pixels of second frame. The second set of pixels has the same coordinates as the first set of pixels. The controller 902 determines whether a third set of pixels of the second frame includes protected information. The third set of pixels has different coordinates than the second set of pixels.

In some examples, the controller 902 causes the display device to display a prompt to select a first area of the second frame that includes protected information. The controller 902 causes the display device to display a prompt to modify labels of the first area.

The method 100, 400, 700 is implemented by machine-readable instructions stored to a storage device (e.g., the storage device 304, 604, the non-transitory machine-readable medium 904) of an electronic device (e.g., the electronic device 200, 300, 600, 900), in various examples. A processor (e.g., the processor 302, 602, the controller 902) of the electronic device executes the machine-readable instructions to perform the method 100, 400, 700, for example. Unless infeasible, some or all of the method 100, 400, 700 may be performed concurrently or in different sequences. For example, the processor performs a block that occurs responsive to a command sequential to the block describing the command. In another example, the processor performs a block that depends upon a state of a component after the state of the component is enabled or disabled.

Values for thresholds (e.g., intensity threshold, threshold amount), labels (e.g., the list of labels that indicate protected information), indicators (e.g., indicators that indicate a sensitivity of a label that indicates protected information), or a combination thereof, as described in the above examples, are determined during an installation process, in some examples. For example, the installation process installs an executable code that enables a user to modify the values for the thresholds, the labels, the indicators, or the combination thereof. The user modifies the protected information to include identifiers, passwords, user-defined objects, user-defined words, or a combination thereof, for example. As described above with respect to FIG. 1 or 6, the executable code that enables the user to modify the values provides a GUI (e.g., the GUI 204) for display by a display device (e.g., the display device 202) of an electronic device (e.g., the electronic device 200, 300, 600, 900), the GUI to enable modification of the values. The values are stored to a storage device (e.g., the storage device 304, 604, the non-transitory machine-readable medium 904) of the electronic device.

Utilizing the electronic device 200, 300, 600, 900 that modifies the visibility of protected information provides for an enhanced user and audience experience by reducing distractions for the audience. Enhancing the effectiveness of communication between the user and the audience enhances user productivity.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
a hardware processor to:
   determine that a first image frame includes protected information, the image frame having a first visibility;
   generate a second image frame, the second image frame being a duplicate of the first image frame;
   modify, responsive to determining that the first image frame includes the protected information, an area of the protected information within the second image frame to have a second visibility; and
   cause a display device to display a prompt to select between the first image frame and the second image frame.

2. The electronic device of claim 1, wherein the hardware processor is to modify the area of the protected information to have the second visibility by inserting an image or a video signal in the area of the protected information.

3. The electronic device of claim 1, wherein the first image frame has a first source and the hardware processor is to:
   determine that a second third image frame having a second source includes second protected information, the third image frame having the first visibility;
   modify, responsive to determining that the third image frame includes the second protected information, a second area of the second protected information to have the second visibility; and
   cause a display device to display at least one of the first image frame, the second image frame, or the third image frame.

4. The electronic device of claim 1, wherein the hardware processor is to:
   responsive to a selection of the first image frame, cause the display device to display the first image frame or cause a network interface to transmit the first image frame; and
   responsive to a selection of the second image frame, cause the display device to display the second image frame or cause the network interface to transmit the second image frame.

5. The electronic device of claim 1, wherein the hardware processor is to determine that the first image frame includes the protected information identifying text contained within the first image frame.

6. The electronic device of claim 1, wherein the hardware processor is to modify the area of the protected information to have the second visibility by reducing an intensity of a set of pixels contained within the area of the protected information.

7. The electronic device of claim 1, wherein the protected information includes an identifier or a password.

8. The electronic device of claim 1, wherein the first image frame is one of a plurality of frames of a video signal, and the hardware processor is to generate the second image frame and modify the area of the protected information within the second image frame for the plurality of frames of the video signal.

9. A non-transitory machine-readable medium storing machine-readable instructions which, when executed by a controller of an electronic device, cause the controller to:
   determine whether a difference between a first image frame and a second image frame exceeds a threshold amount, the second image frame subsequent to the first image frame;
   responsive to determining that the difference exceeds the threshold amount, determine that the second image frame includes protected information;
   generate, responsive to determining that the second image frame includes the protected information, a third image frame that is a duplicate of the second image frame and has a first visibility;
   modify, within the third image frame, an area of the protected information to have a second visibility, the second visibility being less than the first visibility; and
   cause a display device to display a prompt to select the second image frame or the third image frame to share.

10. The non-transitory machine-readable medium of claim 9, wherein:
   the first image frame has the first visibility for a first set of pixels and the second visibility for a second set of pixels; and
   the controller is to, responsive to determining that the difference does not exceed the threshold amount, modify the second image frame to have the first visibility for the first set of pixels and the second visibility for the second set of pixels.

11. The non-transitory machine-readable medium of claim 9, wherein, to determine that the second image frame includes the protected information, the controller is to:
   determine that a first set of pixels of the first image frame is equivalent to a second set of pixels of the second image frame, the second set of pixels having same coordinates as the first set of pixels; and
   determine whether a third set of pixels of the second image frame includes the protected information, the third set of pixels having different coordinates than the second set of pixels.

12. The non-transitory machine-readable medium of claim 9, wherein the protected information includes an identifier or a password.

13. The non-transitory machine-readable medium of claim 9, wherein the threshold amount is determined responsive to a frame rate of the display device.

14. The non-transitory machine-readable medium of claim 9, wherein the controller is to modify, within the third image frame, the area of the protected information to have the second visibility by reducing an intensity of a set of pixels contained within the area of the protected information within the third image frame.

15. The non-transitory machine-readable medium of claim 9, wherein the controller is to determine that the second image frame includes the protected information by identifying text contained within the second image frame.

16. An electronic device, comprising:
a display device;
memory storing machine-readable instructions; and
a processor to execute the machine-readable instructions to:
  determine whether a difference between a first image frame and a second image frame exceeds a threshold amount, the second image frame subsequent to the first image frame;
  responsive to determining that the difference between the first image frame and the second image frame exceeds the threshold amount, determine that the second image frame includes protected information;
  generate, responsive to determining that the second image frame includes the protected information, a third image frame that is a duplicate the second image frame and has a first visibility;
modify, within the third image frame, an area of the protected information to have a second visibility, the second visibility being less than the first visibility; and
cause the display device to display a prompt to select the second image frame or the third image frame to share.

17. The electronic device of claim 16, wherein:
the first image frame has the first visibility for a first set of pixels and the second visibility for a second set of pixels; and
the processor is to execute the machine-readable instructions to, responsive determining that the difference does not exceed the threshold amount, modify the second image frame to have the first visibility for the first set of pixels and the second visibility for the second set of pixels.

18. The electronic device of claim 16, wherein the processor is to execute the machine-readable instructions to determine the threshold amount based on a frame rate of the display device.

19. The electronic device of claim 16, wherein the processor is to execute the machine-readable instructions to determine that the second image frame includes the protected information by identifying text contained within the second image frame.

20. The electronic device of claim 16, wherein the processor is to execute the machine-readable instructions to modify, within the third image frame, the area of the protected information to have the second visibility by reducing an intensity of a set of pixels contained within the area of the protected information within the third image frame.

* * * * *